United States Patent [19]

Welter et al.

[11] Patent Number: 4,613,362
[45] Date of Patent: Sep. 23, 1986

[54] METHOD OF MAKING MAGNESIUM-CONTAINING METAL GRANULATE FOR THE STORAGE OF HYDROGEN

[75] Inventors: Jean-Marie Welter, Aachen, Fed. Rep. of Germany; Peter Rudman, Ringwood, N.J.

[73] Assignee: Kernforschungsanlage Julich, Julich, Fed. Rep. of Germany

[21] Appl. No.: 638,636

[22] Filed: Aug. 7, 1984

Related U.S. Application Data

[62] Division of Ser. No. 445,708, Dec. 1, 1982, abandoned.

[30] Foreign Application Priority Data

Dec. 3, 1981 [DE] Fed. Rep. of Germany ..... 31478395

[51] Int. Cl.[4] .............................................. C22C 1/04
[52] U.S. Cl. .............................. 75/0.5 B; 75/0.5 BA; 75/0.5 C; 420/590; 420/900
[58] Field of Search ........................... 423/644, 648 R; 420/900, 590; 75/0.5 R, 0.5 B, 0.5 BA; 264/10

[56] References Cited

U.S. PATENT DOCUMENTS

| | | | |
|---|---|---|---|
| 3,720,737 | 3/1973 | Klaphaak | 75/0.5 C |
| 3,764,295 | 10/1973 | Lindskog et al. | 75/0.5 C |
| 4,072,514 | 2/1978 | Suzuki | 420/402 |
| 4,278,466 | 7/1981 | De Pous | 423/644 |
| 4,300,946 | 11/1981 | Simons | 75/0.5 B |
| 4,368,143 | 1/1983 | de Pous | 252/457 |
| 4,402,933 | 9/1983 | de Pous | 423/648 R |
| 4,431,561 | 2/1984 | Ovshinsky et al. | 252/184 |

Primary Examiner—Christopher W. Brody
Attorney, Agent, or Firm—Scully, Scott, Murphy and Presser

[57] ABSTRACT

A magnesium-containing metal granulate for the storage of hydrogen in magnesium or in an allow containing magnesium, which includes granulate particles having a catalyst applied on the surfaces thereof.

12 Claims, 2 Drawing Figures

METHOD OF MAKING MAGNESIUM-CONTAINING METAL GRANULATE FOR THE STORAGE OF HYDROGEN

This is a divisional of copending application Ser. No. 445,708, filed on Dec. 1, 1982 now abandoned.

BACKGROUND OF THE INVENTION

1. Field of the Invention

The present invention relates to a magnesium-containing metal granulate for the storage of hydrogen in magnesium or in an alloy-containing magnesium, which includes granulate particles having a catalyst applied on the surfaces thereof.

In contrast to other metals or metal alloys, especially such metal alloys which contain titanium or lanthanum, magnesium is preferred for the storage of hydrogen not only because of its lower material costs, but above all, because of its lower specific weight as a storage material. However, the hydrogenation $$Mg + H_2 \rightarrow MgH_2$$

is, in general, more difficult to achieve with magnesium, inasmuch as the surface of the magnesium will rapidly oxidize in air so as to form stable MgO and/or Mg(OH)$_2$ surface layers. These layers inhibit the dissociation of hydrogen molecules, as well as the adsorption of-produced hydrogen atoms and their conductance from the surface of the granulate particles into the magnesium storage mass. Efforts are being made to ameliorate through catalysts the disadvantages which are hereby encountered during the storage of hydrogen in magnesium.

2. Discussion of the Prior Art

It is known that the storage quality of magnesium and magnesium alloys can be enhanced in that magnesium, which forms stable oxides (and stable hydroxides), is alloyed with a metal phase which forms unstable oxides (and unstable hydroxides). The comments made with respect to the oxides are analogous for stable and unstable hydroxides under normal hydrogenation conditions, for such an alloy the partial pressure of oxygen is only sufficient for the formation of stable oxides. The formers for unstable oxides are reduced during the hydrogenation and remain present as metals. For example, such an alloy is Mg$_2$Ni, in which the Ni forms unstable oxides. In this alloy, thermodynamic examinations indicated that the surface reaction Mg$_2$Ni+O$_2\rightarrow$2-MgO+Ni extended over nickel metal inclusions which catalyze the dissociation-adsorption reaction. Reference may be had to A. Seiler et al., Journal of Less-Common Metals 73, 1980, pages 193 et seq.

A further possibility for the catalysis of the dissociation-adsorption reaction on the surface of magnesium lies also in the formation of a two-phase alloy, wherein the one phase is a hydride former, and the other phase is a catalyst. Thus, it is known to employ galvanically-nickeled magnesium as a hydrogen storage, referring to F.G. Eisenberg et al. Journal of Less-Common Metals 74, 1980, pages 323 et seq. However, there were encountered problems during the adhesion and the distribution of the nickel over the magnesium surface.

In order to obtain an extremely dense and good adherent catalyst phase under the formation alone of equilibrium phases, it is also known to that for the storage of hydrogen there can be employed an eutectic mixture of magnesium as a hydride-forming phase in conjunction with magnesium copper (Mg$_2$Cu), referring to J. Genossar et al., Zeitschrift fur Physikalische Chemie Neue Folge 116, 1979, pages 215 et seq. The storage capacity per volume of work material which is achieved through this magnesium-containing granulate does not, however, meet any high demands because of the quantity of magnesium copper which is required for the eutectic mixture.

SUMMARY OF THE INVENTION

Accordingly, it is an object of the present invention to provide a magnesium-containing metal granulate for the storage of hydrogen which not only evidences a high storage capacity for hydrogen per volume, but which can also be produced in a simple manner.

This object is achieved through an inventive granulate of the above-mentioned type wherein the surface of the granulate particles includes iron or a ferriferous alloy as a catalyst.

Iron is soluble in magnesium only to a negligible extent and does not form an intermetallic compound with magnesium. This behavior of magnesium and iron can be utilized for the coating of the magnesium granulate particles with iron. During the granulation of magnesium having fine iron particles interspersed therethrough, iron particles are exposed in a simple manner to a sufficient extent on the surface of the granulate particles and are embedded in the magnesium without the formation of an intermediate layer which inhibits the hydrogenation of the granulate particles, so that also any subsequent oxidation of the iron-covered granulate particles will not hinder the storage of hydrogen, inasmuch as the unstable iron oxide and the iron hydroxide will be reduced under the usual hydrogenation conditions for magnesium at temperatures of between about 300° and 400° C. In order to obtain a sufficient covering of the surface of the granulate particle with iron for achieving the catalytic effect, it is adequate to provide an iron content of between 1 and 20% by weight. The potential storage capability per granulate volume which is predetermined by the magnesium component in the granulate, is thereby only insignificantly influenced by the catalyst component.

For the production of the granulate, ferriferous magnesium or a ferriferous magnesium alloy is granulated. About 1 to 20% by weight of iron is added to the magnesium or the magnesium-containing alloy. Pursuant to the invention, the following process is carried out: Initially, magnesium is smelted together with fine iron particles, and the iron particles, which remain in a solid phase at the smelt temperature of the magnesium, are homogeneously distributed throughout the smelt. This distribution is maintained during the solidification of the smelt, which is achieved particularly through the rapid cooling down of the smelt. The solidified material is then chipped so as to form a granulate. Hereby, iron particles are exposed on the surface of the formed granulate particles in a sufficient quantity, which are embedded in magnesium on the surface of the particles of the granulate. No intermediate layers which would tend to inhibit the hydrogenation of the metal granulate are present between the iron particles and the magnesium.

A chipping or comminuting for the granulation of the material which contains the iron particles is eliminated subsequent to the solidification of the smelt by means of a process in which the magnesium is smelted together with fine iron particles, wherein the iron particles are homogeneously distributed throughout the magnesium smelt and the smelt is granulated through spraying. This process is preferred for a continuous or semi-continuous granulate formation. The smelt which contains the iron particles in a homogeneous distribution is then granulated through spraying, for example through spraying in an atomizing tower, or through spraying onto a cooled rotating disc. The solidified particles form a fine-particled metal granulate including iron particles which are embedded on the surface of the granulate particles.

BRIEF DESCRIPTION OF THE DRAWINGS

Further advantageous measures for the production of the granulate, and for the storage levels achieved through the magnesium-containing and ferriferous granulate pursuant to the invention with regard to the storage of hydrogen are described in the exemplary embodiments set forth hereinbelow, taken in conjunction with the accompanying drawings; in which.

DETAILED DESCRIPTION

Sponge iron having an average particle diameter size of between 20 to 40 μm was admixed with magnesium chips, and the mixture then compacted. The mixture contained 10% by weight of iron. The mixture was then smelted in a graphite crucible. Instead of a graphite crucible it is possible to advantageously employ a crucible which is constituted of iron or of a ferriferous alloy, such as cast iron or steel, inasmuch as iron crucibles will not react with the iron particles which are to be added. However, iron crucibles also do not react with hydrogen so that, when utilizing iron crucibles, the mixture can be smelted in a hydrogen atmosphere. The smelting within graphite crucibles is carried out in an inert gas atmosphere, in the exemplary embodiment, argon was employed. The smelt temperature was at about 800° C. Through stirring of the smelt, care was taken that the iron particles would be homogeneously distributed throughout the smelt. In order to maintain this distribution, the smelt was rapidly cooled. Subsequent to the cooling, the smelt product was chipped or comminuted.

Figure 1:
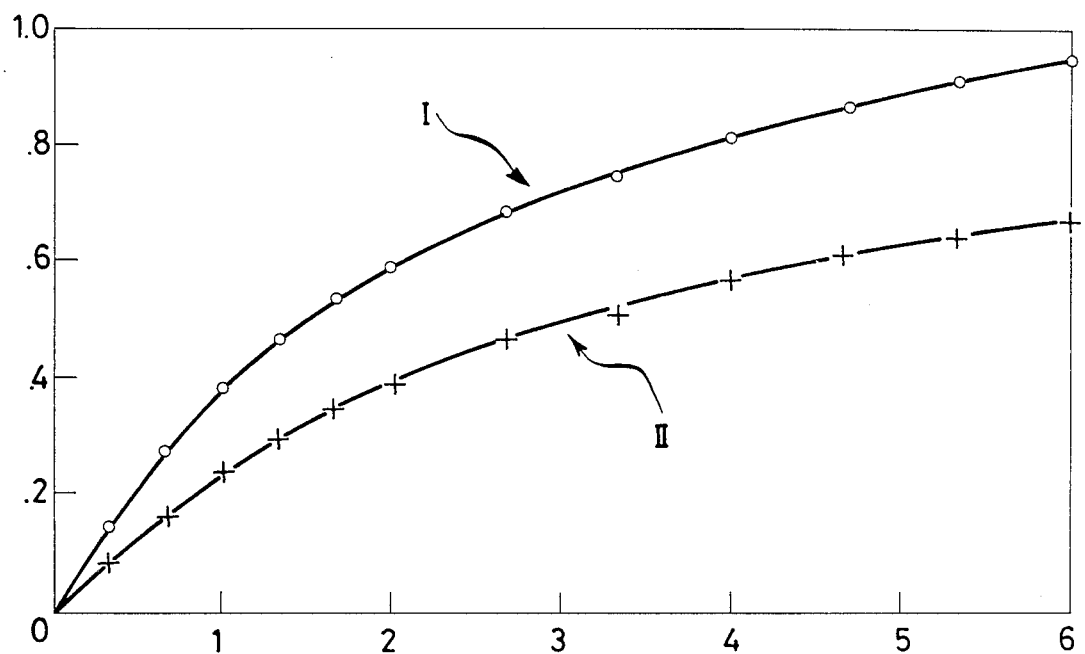
FIG. 1 illustrates the hydrogen charging of a granulate of magnesium including 10% by weight of iron at a constant pressure of 1.5 MPa and a constant temperature of 400° C. in dependence upon the charging period.

The storage or hydrogen achieved by means of the hereinabove described ferriferous magnesium granulate is represented in FIG. 1 of the drawing with regard to the storage of hydrogen in a pure magnesium granulate. In the graph of FIG. 1, the component of the magnesium fraction which has been hydrogenated through the inclusion of hydrogen is illustrated in dependence upon the charging period. Curve I illustrates the charging of a magnesium granulate which is catalyzed with iron, Curve II illustrates the charging of an uncatalyzed granulate of pure magnesium. Both granulates were activated in the same manner prior to their charging. For this purpose, there were undertaken twenty hydrogenation cycles, wherein the granulate was treated in a hydrogen atmosphere at 1.5 MPa and at a temperature varying periodically within a period of about 30 minutes between 350° and 450° C. Curve I, in comparison with Curve II, clearly illustrates that the addition of iron to magnesium leads to a significantly improved hydrogenation kinetic. For the same charging period, in the iron-catalyzed granulate (Curve I) there were hydrogenated approximately 1.5 times as many magnesium quantities in comparison with the pure magnesium granulate (Curve II).

Subsequent to the charging with hydrogen as represented in Figure I, both granulates were exposed to air under atmospheric pressure for a period of one day. Thereafter, the granulates were charged anew with hydrogen under the same conditions. It was ascertained that the hydrogen inclusion took place more slowly; nevertheless, it was significant that there could now be charged only 20% of the magnesium granulate which was not catalyzed with iron, whereas magnesium granulate which was catalyzed with iron could be hydrogenated up to almost 100%. Notwithstanding the partial oxidation of the ferriferous granulate, there remained intact the high hydrogen charging and discharging capability of the storage material.

Produced was a magnesium granulate including 4% by weight of iron. The iron was homogeneously distributed over the surface of the granulate particles. The granulate, as described hereinabove, was activated in twenty hydrogenation cycles. The charging capacity of this granulate, under the same charging requirements, notwithstanding a lower iron content, was only slightly below the values which can be ascertained from FIG. 1 for a magnesium granulate with 10% by weight of iron (Curve I).

At a higher iron content it is possible to achieve a more satisfactory storing behavior for hydrogen. However, the charging capacity of the magnesium granulate recedes per storage volume. There must additionally be considered the increasing specific weight of the granulate. Accordingly, the iron content is thus suitably limited to 20% by weight of iron.

In lieu of pure iron, also ferriferous alloys come into consideration as catalysts such as, for example, compacted-powder steel, scrap iron or scrap steel. As storage material, there can also be employed, besides magnesium, magnesium alloys such as magnesium-nickel, magnesium-copper or lithium-containing, zinc-containing or manganese-containing magnesium.

Figure 2:
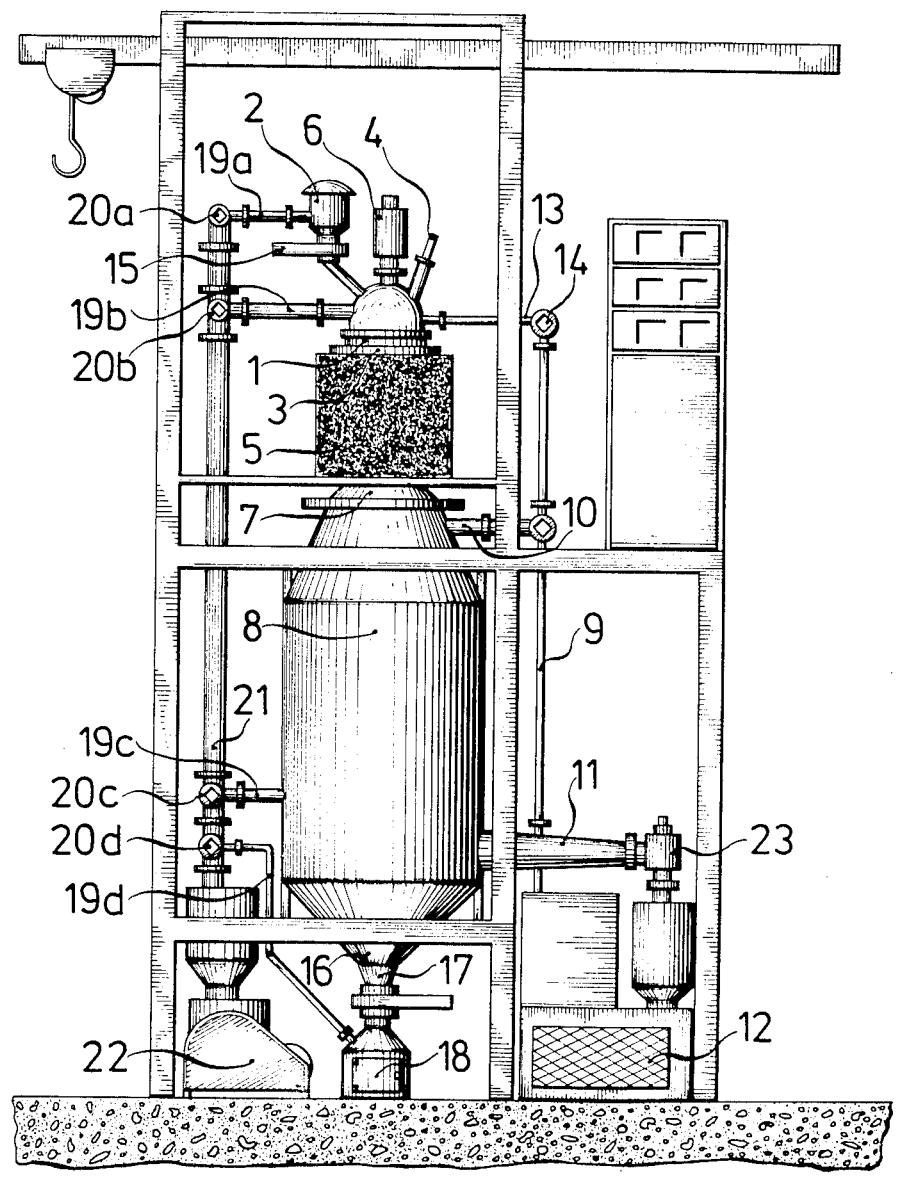
FIG. 2 illustrates an installation for the semicontinuous production of a ferriferous magnesium granulate.

Illustrated schematically in FIG. 2 of the drawings is an installation for the semi-continuous production of ferriferous manganese granulate. The installation includes a smelting crucible 1 of iron or steel, wherein the material which is introduced through a sluice valve 2 can be smelted by means of jacket heating or, alternatively, through the intermediary of steel-encased electrical heater elements 4 projecting into the smelting crucible. Heat loses are maintained low by means of a thermal insulation 5. Inserted into the smelting crucible 2 is a stirring device 6 for the mixing through of the smelt. Provided in the bottom of the smelt crucible is an outlet 7 leading to an atomizing tower 8. Communicating with the upper region of the atomizing tower is a pressurized-gas conduit 9 with an expansion connector 10. The cold gas which streams out of the expansion connector 10 supports the dissolution of the smelt jet streaming out of the outlet 7 into droplets which solidify during their fall through the atomizing tower. For the atomization of the smelt jet, in order to prevent the formation of undesirable chemical reactions, in particular to prevent oxidation, there can be employed an inert gas such as nitrogen or argon. Advantageously, hydrogen is blown in so as to already fill the material in this phase with hydrogen. This ameliorates the subsequent capability to absorb hydrogen by the produced granulate, and appreciably shortens the activating treatment.

From the atomizing tower 8, the introduced gas is conducted through an exhaust connector 11 to a processing unit 12 in which it is cooled, cleansed and again pressurized. By means of a branch conduit 13 of the pressurized-gas conduit 9 there can be maintained a gas atmosphere of a few bar in the smelting crucible 1. The pressure is adjusted through a valve 14 so that, during smelting, there is inhibited any excessive vaporization of the magnesium.

In order to afford a semi-continuous production of metal granulate, magnesium pieces together with sponge iron or iron powder with maximum particle sizes of up to 100 μm are introduced through the sluice valve 2 which can be closed off from the smelting chamber in the smelting crucible 1 by means of a closure 15. The smelting temperature is adjusted to approximately 800° C., the iron particles are thereby maintained in the smelt in a solid phase. The iron particles are homogeneously distributed through stirring of the smelt. The smelt exits at the outlet 7 through nozzles (not shown in the drawing). In the atomizing tower the smelt jet is impinged against by the gas stream from the expansion connector 10, and disperses into individual droplets. The droplets solidify during their fall through the atomizing tower into granular particles which collect at the bottom 16 of the atomizing tower 8. From there they are conveyed out through a granulate discharge 17 into a receiving container 18. During the emptying of the receiving container, the granulate discharge 17 remains closed. When the granulate is produced in a hydrogen atmosphere, it is suitable to maintain the receiving container at a temperature of about 350° C. in order to continue the hydrogenation of the material. The longer the granulate is maintained in a hydrogen atmosphere, the lower is the energy requirement for the activation of the produced material.

In order to avoid any undesired oxidation of the magnesium granulate through oxygen-containing gases, the smelting chamber of the smelting crucible 1, the atomizing tower 8, the sluice 2 and the receiving container 18 are evacuated. All previously mentioned installation components can be degased through suction conduits 19a through 19d which include valves 20a through 20d and connect into a collecting conduit 21, by means of a vacuum pump 22 to the suction side of which there is connected the collecting conduit 21.

The granulate particle size can be influenced in dependence upon the setting of the nozzle cross-section at the outlet 7, as well as in dependence upon the atomizing jet which exits at the expansion connector 10 and is adjustable through a valve 23. The dissolution of the smelting jet is so regulated that the granulate particle sizes will not substantially exceed 500 μm.

In a further exemplary embodiment there was produced a homogeneous mixture commencing with a commercial MgH₂ powder having particle sizes below 10 μm and sponge iron of an average particle size diameter of between 20 to 40 μm, with the utilization of a stirring device. The mixture was poured into sealable reaction vessel. The reaction vessel was encompassed by the heating jacket and included a relief valve. For the sintering of the mixture, there was set a temperature of 600° C. and a pressure of 0.1 MPa. The hydrogen escaping from the mixture was discharged through the relief valve, and after conduction through a water flask, was torched. After the ejection of the hydrogen and quenching of the torch, the sintered material was cooled. The material contained 10% by weight of iron. The sintered material was porous so that a coarse chipping of the material was already adequate to produce a suitable granulate. The granulate was activated in the usual manner. Twenty hydrogenation cycles where undertaken, in which the granulate was treated in a hydrogen atmosphere at 1.5 MPa and, as hereinabove already described, at a periodically varying temperature of between 350° and 450° C.

The hydrogenation values achieved with the thereby produced and activated magnesium granulate deviated only insignificantly from the values represented in FIG. 1 of the drawings.

What is claimed is:

1. A process for the production of a magnesium-containing metal granulate which is adaptable for the storage of hydrogen, comprising adding a catalytically effective amount of iron or a ferriferous alloy to molten magnesium or a molten magnesium-containing alloy to obtain a ferriferous magnesium or a ferriferous magnesium alloy and granulating said ferriferous magnesium or ferriferous magnesium alloy thereby forming a catalytically active surface upon said granulated ferriferous magnesium or ferriferous magnesium alloy, said catalytically active surface promoting the storage of hydrogen by said granulated ferriferous magnesium or ferriferous magnesium alloy.

2. Process as claimed in claim 1, comprising adding about 1 to 20% by weight of iron to the magnesium or magnesium-containing alloy.

3. Process as claimed in claim 1 or 2, comprising smelting the magnesium together with fine iron particles; homogeneously distributing the iron particles in the magnesium smelt and maintaining said homogeneous distribution during solidification of the smelt; and granulating the solidified material.

4. Process as claimed in claim 1 and 2, comprising smelting magnesium together with fine iron particles; homogeneously distributing the iron particles in magnesium smelt; and granulating the smelt through spraying.

5. Process as claimed in claim 1, comprising smelting said material in a crucible formed of iron or a ferriferous alloy.

6. Process as claimed in claim 1, comprising smelting the magnesium or magnesium containing alloy together with sponge iron or powdered iron having particle sizes equal to or smaller than 100 μm.

7. Process according to claim 1, comprising effecting said smelting in a hydrogen atmosphere.

8. A process for the production of a magnesium-containing metal granulate which is adaptable for the storage of hydrogen, comprising adding a catalytically effective amount of powdered iron or a powdered ferriferous iron alloy to powdered magnesium or a powdered magnesium-containing alloy; sintering the formed mixture and granulating the sintered mixture to thereby obtain a granulated material suitable for promoting the storage of hydrogen.

9. Process as claimed in claim 8, comprising sintering the mixture at less than 100° C. below the smelting temperature of the magnesium.

10. Process as claimed in claim 8 or 9, comprising utilizing magnesium-containing MgH₂ powder.

11. Process as claimed in claim 1, comprising activating the metal granulate in a hydrogen atmosphere at 1.5 MPa and at a temperature of between 350° and 450° C.

12. Process as claimed in claim 11, comprising activating said metal granulate at a temperature of 400° C.

* * * * *